US012656551B2

(12) United States Patent
Lee et al.

(10) Patent No.: US 12,656,551 B2
(45) Date of Patent: Jun. 16, 2026

(54) OPTICAL COMPONENT

(71) Applicant: Fraunhofer-Gesellschaft zur Förderung der angewandten Forschung e.V., Munich (DE)

(72) Inventors: Moon-Hyeok Lee, Berlin (DE); Martin Möhrle, Berlin (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 264 days.

(21) Appl. No.: 18/323,554

(22) Filed: May 25, 2023

(65) Prior Publication Data

US 2023/0296841 A1 Sep. 21, 2023

Related U.S. Application Data

(63) Continuation of application No. PCT/EP2020/087200, filed on Dec. 18, 2020.

(51) Int. Cl.
*G02B 6/26* (2006.01)
*G02B 6/42* (2006.01)
*G02B 26/00* (2006.01)

(52) U.S. Cl.
CPC ........... *G02B 6/262* (2013.01); *G02B 6/4203* (2013.01); *G02B 26/004* (2013.01)

(58) Field of Classification Search
CPC ............ G02B 6/29359; G02B 6/29337; G02B 6/262; G02B 6/29358
See application file for complete search history.

(56) References Cited

U.S. PATENT DOCUMENTS 3,870,398 A * 3/1975 Love .................... G02B 6/2817
359/833
7,817,882 B2 10/2010 Blauvlet et al.
(Continued)

FOREIGN PATENT DOCUMENTS

DE 19936187 A1 2/2001
JP 62011810 A * 1/1987 ............. G02B 6/262
(Continued)

OTHER PUBLICATIONS

Translation of JP62011810A (Year: 1987).*
(Continued)

*Primary Examiner* — Chad H Smith
(74) *Attorney, Agent, or Firm* — Bridgeway IP Law Group, PLLC; Jihun Kim

(57) ABSTRACT

Proposed is an optical component comprising: at least one first waveguide, the first waveguide comprising at least one partially reflective output end facet, wherein light passing the output end facet of the first waveguide propagates along a first propagation direction, and at least one second waveguide receiving the light passing the output end facet of the first waveguide at an input end facet of the second waveguide and guiding the light in a second propagation direction, wherein the output end facet and the input end facet are spaced from each other; and wherein the first waveguide and the second waveguide are arranged such that the first propagation direction and the second propagation direction are different. This proposal provides a concept, which is more efficient in view of coupling efficiency between the waveguides of the optical component.

10 Claims, 3 Drawing Sheets

(56) References Cited

U.S. PATENT DOCUMENTS

| | | | |
|---|---|---|---|
| 2002/0106156 A1* | 8/2002 | Vail .................. | H01S 3/094003 |
| | | | 385/37 |
| 2011/0019708 A1 | 1/2011 | Behfar et al. | |
| 2011/0292496 A1* | 12/2011 | Mohrdiek ............... | G02B 6/30 |
| | | | 359/341.1 |

FOREIGN PATENT DOCUMENTS

| | | | | |
|---|---|---|---|---|
| WO | WO-2004019087 A2 * | 3/2004 | ............. | G02B 6/266 |
| WO | 2004068542 A2 | 8/2004 | | |
| WO | 2004019087 A3 | 5/2006 | | |

OTHER PUBLICATIONS

Tetsuhiko Ikegami, "Reflectivity of mode at facet and oscillation mode in double-heterostructure injection lasers", Eee J. Quantum Electron., Jun. 1972, vol. 8, No. 6.

Jens Buus et al., "Tunable Laser Diodes and Related Optical Sources", 2nd Edition Wiley, 2005, pp. 50-59.

Emil Kleijin et al., "Multimode Interference Reflectors: A New Class of Components for Photonic Integrated Circuits" Journal of Lightwave Technology, Sep. 15, 2013, vol. 31, No. 18, doi: 10.1109/JLT.2013.2278187, XP011525450, DOI: http://dx.doi.org/10.1109/JLT.2013.2278187.

Y.Huang et al., "A Single-Directional Microcavity Laser with Microloop Mirrors and Widened Medium Realized With Quantum-Well Intermixing", IEEE Photon. Technol. Lett., (20060000), vol. 18, No. 1, doi:10.1109/LPT.2005.860066, XP055010214, DOI: http:/dx.doi.org/10.1109/LPT.2005.860066.

Teruhito Matsui, "GaInAsP/InP lasers with etched mirrors by reactive ion etching using a mixture of ethane and hydrogen", Appl. Phys. Lett., vol. 54, Mar. 27, 1989, pp. 1193-1194.

Todd C. Kleckner et al., "Design, Fabrication, and Characterization of Deep-Etched Waveguide Gratings", Journal of Lightwave Technology, Nov. 2005, vol. 23, No. 11, pp. 3832-3842.

Moroz, Alexander, "Office Action for European Application No. 20838968.4", Nov. 26, 2025, EPO, Germany.

* cited by examiner

OPTICAL COMPONENT

CROSS-REFERENCE TO RELATED APPLICATIONS

This application is a continuation of copending International Application No. PCT/EP2020/087200, filed Dec. 18, 2020, which is incorporated herein by reference in its entirety.

Embodiments according to the present application are concerned with coupling waveguides, particularly with coupling additional waveguides to a laser cavity.

Embodiments according to the invention are related to an optical component.

According to an aspect, embodiments according to the invention can be applied to provide a high coupling efficiency between waveguides.

BACKGROUND OF THE INVENTION

A multitude of optical components comprising two or more coupled waveguides for passing light, particularly used in different integrated devices, such as lasers, photonic integrated circuits (PIC), is currently known.

In laser devices comprising coupled waveguides, reflectors, broadband reflectors, are still of fundamental importance, because they determined the characteristics of a laser cavity.

The conventional way to realize broadband reflectors is to use cleaved facets. A conventional waveguide with a cleaved facet is shown in FIG. 1A. The cleaved facets are applicable to form a reflector because of a discontinuity of refractive index between a waveguide and cladding, as shown for example in FIG. 1A. The facet is fabricated by mechanical cleaving process on wafers. Reflection of such formed reflector shows flat over a wide range of wavelengths and the reflectivity of the reflector can be controlled by coating. However, this conventional cleaving process is not very precise, which, for example, results in a length tolerance of cleaved Fabry-Perot (FP) laser of about ±10 μm. A lot of applications need a higher precision.

Alternative broadband reflectors were introduced to replace cleaved facets in integrated FP lasers on in laser devices where a tight length control is needed. There are several options for such replacement, e.g. deep etched distributed Bragg grating (DBR), multimode interferometer (MMI) reflector, loop mirror, and etched facet.

Distributed Bragg reflectors (DBR) are widely used because of their wavelength selectivity and the possibility to adjust the reflectivity. The DBRs can be generated anywhere in a chip and transmitted light propagates through the DBRs. The DBRs with deep etched gratings are used to realize a broadband reflectivity. However, realization of deep etched gratings with grating periods in the sub-micron range is quite challenging because of its high aspect ratio. MMI reflectors and loop mirrors are based on interference effects in waveguides or couplers. They are widely used in photonic integrated circuits (PIC) because of their ease of fabrication and unrestricted position. However, these reflectors are suffering from a large footprint and thus are not suitable for single devices.

Using etched facets instead of cleaved facets helps to avoid the above mentioned large cleaving process tolerances. A conventional waveguide with an etched facet is shown in FIG. 1B. The error of fabrication is reduced to about ±200 nm or even less in such waveguide. However, if such etched facets are used in integrated devices, an optical coupling of another waveguide is difficult due to unintended reflections from the opposite facet of another waveguide.

FIG. 2 shows two waveguides connected using etched facets. As shown in FIG. 2 an unintended FP effect is formed in the etched area between the two waveguides because of the two unavoidable discontinuities.

FIG. 3 shows a solution to an unintended FP problem. In this conventional solution two waveguides connected using etched facets. First waveguide 1 has a flat output facet 3 guiding light out of the first waveguide. Second waveguide 2 has an angled input facet though which the light is received at the second waveguide 4. By using an angled faced on the second waveguide 2, an attempt to eliminate FP resonances was realized. Part of the light is reflected downward at the angled facet 4 and thus no resonance occurs in the etched region. However, the coupling efficiency from the waveguide 1 to the waveguide 2 is quite low because of the refraction effect at the angled facet. In other words, a considerable amount of light propagates upward because of the angled facet, which leads to high coupling loss.

In view of the above, there is a desire to create a coupling concept of waveguides which improves a coupling efficiency from the facet of the main waveguide, for example, from the etched facet, to additional waveguides.

SUMMARY

According to an embodiment, an optical component may have: at least one first waveguide, the first waveguide comprising at least one partially reflective output end facet, wherein light passing the output end facet of the first waveguide propagates along a first propagation direction, and at least one second waveguide receiving the light passing the output end facet of the first waveguide at an input end facet of the second waveguide and guiding the light in a second propagation direction, wherein the output end facet and the input end facet are spaced from each other; and wherein the first waveguide and the second waveguide are arranged such that the first propagation direction and the second propagation direction are different.

An embodiment according to the invention creates an optical component comprising: at least one first waveguide, the first waveguide comprising at least one partially reflective output end facet, wherein light passing the output end facet of the first waveguide propagates along a first propagation direction, and at least one second waveguide receiving the light passing the output end facet of the first waveguide at an input end facet, e.g. a partially reflective input end facet, of the second waveguide and guiding the light in a second propagation direction, wherein the output end facet and the input end facet are spaced from each other; and wherein the first waveguide and the second waveguide are arranged such that the first propagation direction and the second propagation direction are different.

This embodiment is based on the finding that rotation of two waveguides of the optical component decreases an upward propagation at the output end facet of the second waveguide. This concept provides an increased coupling efficiency between the waveguides of the optical component.

According to an embodiment, an angle between the first propagation direction and the second propagation direction is equal to an angle of refraction at the input end facet. This significantly increases an amount of light coupled from the first waveguide to the second waveguide due to avoiding loss of the light because of the refraction at the input end facet.

According to an embodiment, the input end facet is not normal to the second propagation direction, e.g. an angled facet. This provides an additional reflection to the downward and leads to blocking FP resonance in an area between the waveguides.

According to an embodiment, the input end facet is not normal to the second propagation direction, e.g. an angled facet, and an angle between the first propagation direction and the second propagation direction is equal to an angle of refraction at the input end facet. This embodiment is based on the finding that using a combination of rotation of the waveguides relative to each other and an angled input facet of one of the waveguides improves a coupling efficiency between the waveguides.

According to an embodiment, the output end facet is normal to the first propagation direction, e.g. a flat facet. A first propagation direction parallel to a central longitudinal axis of the first waveguide is thus provided. A certain amount of light is reflected at the output end facet and the rest of light propagates through the output end facet without further refraction losses at the output end facet.

According to an embodiment, at least one of the output end facet and the input end facet is an etched facet and/or a cleaved facet. The broadband reflectors are thus provided at the end facets. Using etched facets reduces a length tolerance, e.g. decreases an error of fabrication.

The use of an etched facet with a high coupling to a second waveguide is a promising candidate to realise simple broadband reflectors and excellent performance. The etched facet may be, for example, made of Indium Phosphide (InP).

According to an embodiment, the output end facet and the input end facet are not in contact with each other. A deeply etched area between the first waveguide and the second waveguide is thus provided.

According to an embodiment, a distance between the output end facet and the input end facet is about a few μm, at a range of about 1-10 μm. This provides an advantage in comparison with the MMI and loop type mirror approach, since the MMI and loop mirror are large of size over 80 μm and a few hundred μm, respectively.

According to an embodiment, the second waveguide is a tapered waveguide, the tapered waveguide having a cross-sectional area decreasing along a direction away from the input facet. The coupling between the first waveguide and the second waveguide is further optimized and considerably increased due to collecting the light by the tapered waveguide.

According to an embodiment, the optical component comprises at least two second waveguides.

According to an embodiment, the first waveguide and the second waveguide are passive components and/or active components. The present concept provides an advantage in comparison with conventionally used butt-joint method to connect passive and active waveguide, since it does not need long taper structures.

According to an embodiment, the first waveguide is a laser cavity, advantageously a Fabry-Perot cavity. Connecting the two structure using the new approach reduces the unwanted additional reflection from the boundary and increases the efficiency of light coupled by input and output waveguides.

According to an embodiment, the optical component is a Fabry-Perot laser or a Fabry-Perot filter.

According to an embodiment, the partially reflective end facet is an external cavity mirror or a ring based mirror or a distributed Bragg reflector, DBR. Novel designs of lasers are thus realized.

According to an embodiment, a region between the output end facet and the input end facet is filled with a gas, like air, or with a transparent material, like a polymer, e.g. having refractive index=1.44. This changes the reflection as needed, e.g. the reflection is decreased, e.g. to 15% when the region is filled with e.g. the polymer.

These and further advantageous aspects are the subject of the dependent claims.

The optical component described above may optionally be supplemented by any of the features, functionalities and details disclosed herein (in the entire document), both individually and taken in combination.

BRIEF DESCRIPTION OF THE DRAWINGS

Embodiments of the present invention will be detailed subsequently referring to the appended drawings, in which.

DETAILED DESCRIPTION OF THE INVENTION

Figures 3, 4:
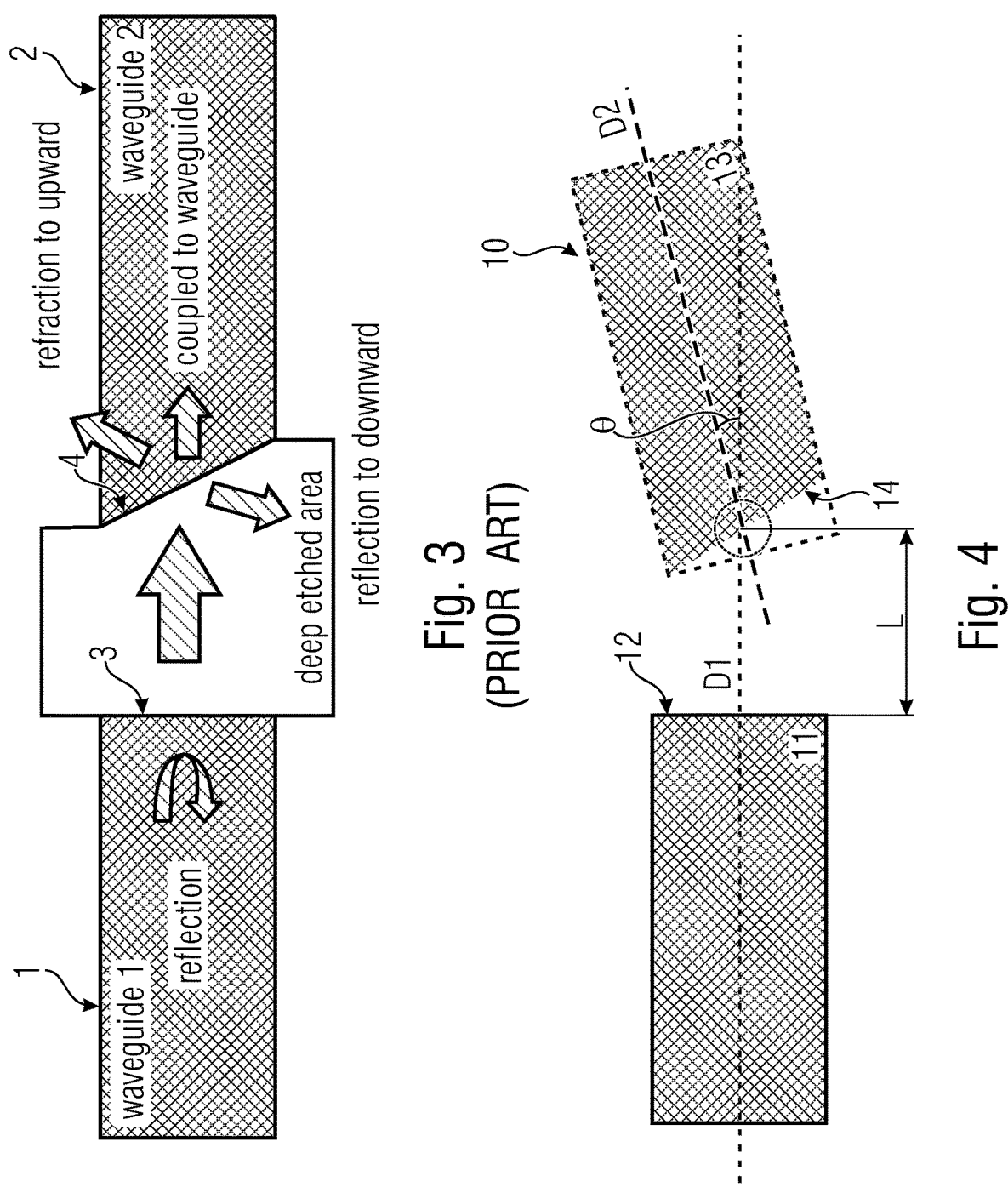
FIG. 3 shows a schematic view of an optical component as known from conventional technology.
FIG. 4 shows a schematic view of an optical component in accordance with an embodiment.

FIG. 4 shows a schematic view of an optical component 10 in accordance with an embodiment.

The optical component 10 comprises two waveguides 11 and 13. A first waveguide 11 comprises a partially reflective output end facet 12. A second end facet of the first waveguide could be an input end facet or an output end facet, for example also a partially reflective output end facet. A certain amount of light is reflected at the output end facet 12 into the first waveguide and the rest of the light propagates through the region between the waveguides as free space propagation.

Light passing the output end facet 12 of the first waveguide 11 propagates along a first propagation direction D1. The first propagation direction is, for example, parallel to a central longitudinal axis of the first waveguide 11. The output end facet 12 is normal to the first propagation direction D1. The output end facet 12 is, for example, normal to the central longitudinal axis of the first waveguide 11.

A second waveguide 13 comprising an input end facet 14 is arranged at a distance from the first waveguide 11. The second waveguide 13 is rotated relative to the first waveguide, for example a central longitudinal axis of the second waveguide 13 is rotated at an angle relative to the central longitudinal axis of the first waveguide 11. The input end facet 14 of the second waveguide 13 is spaced from the output end facet 12 of the first waveguide 11. A distance L between the output end facet 12 and the input end facet 14 is about a few μm, at a range of about 1-10 μm. The input end facet 14 is an angled facet. The input end facet 14 is, for example, not normal to the central longitudinal axis of the second waveguide 13. At the angled input end facet some reflection occurs to block FP resonance in the region between the waveguides.

The second waveguide 13 receives the light passing the output end facet 12 of the first waveguide 11 at the input end facet 14 of the second waveguide 13. The second waveguide 13 guides the light in a second propagation direction D2, which is different from the first propagation direction D1 due to an arrangement of the first waveguide 11 and the second waveguide 13 relative to each other. The input end facet 14 is not normal to the second propagation direction D2.

In an embodiment, an angle θ between the first propagation direction D1 and the second propagation direction D2 is equal to an angle of refraction at the input end facet 14.

Different structures of the optical component 10, for example, different amount of the waveguides included, may be present in embodiments. The optical component 10 may comprise, for example, one first waveguide and two second waveguides in accordance with an embodiment.

However, it should be noted that the optical component 10 may optionally be supplemented by any of the features, functionalities and details disclosed herein, both individually or taken in combination.

Figures 5, 6:
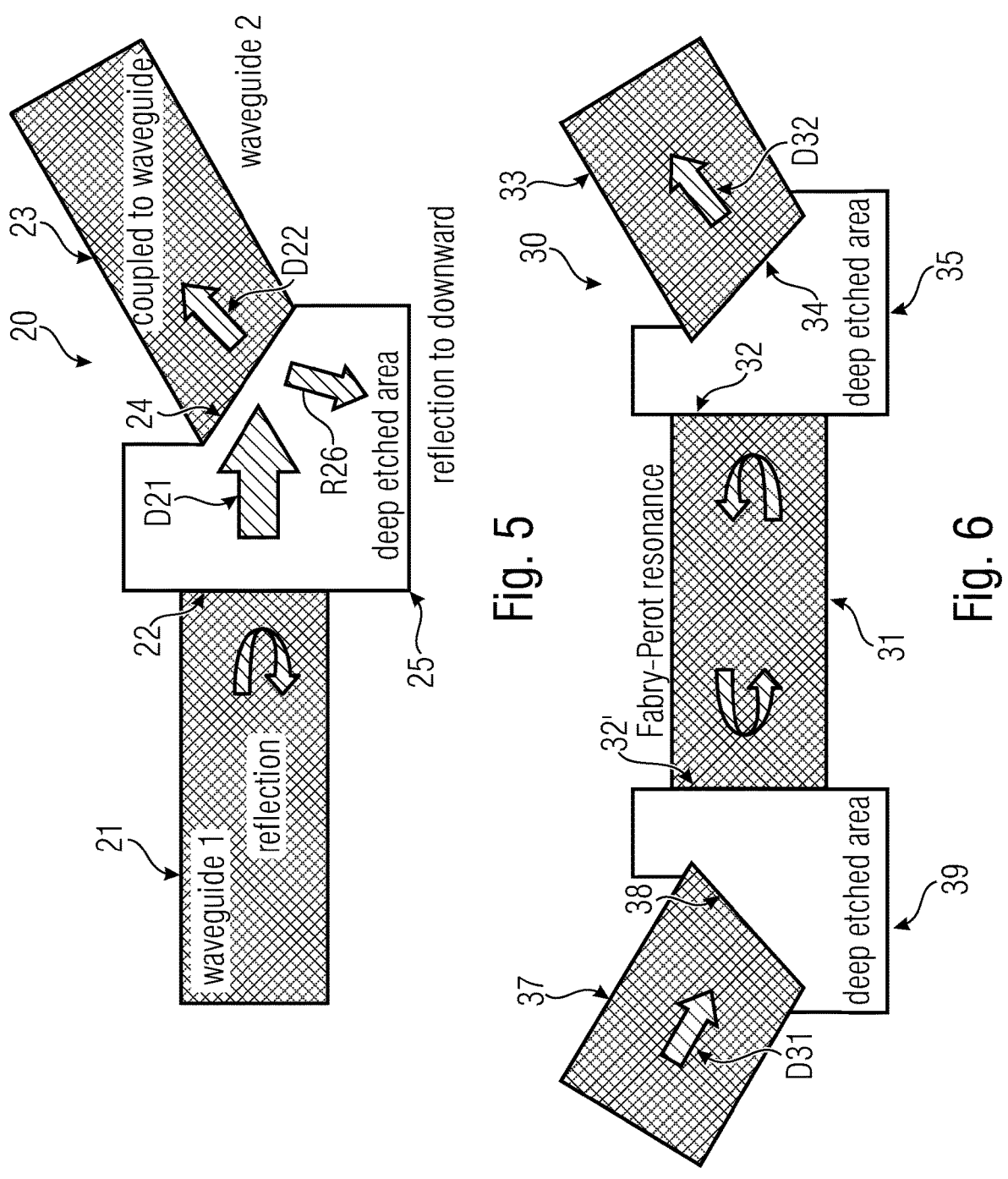
FIG. 5 shows a schematic view of an optical component in accordance with an embodiment.
FIG. 6 shows a schematic view of an optical component in accordance with an embodiment.

FIG. 5 shows a schematic view of an optical component 20 in accordance with an embodiment.

The optical component 20 comprises two waveguides 21 and 23. A first waveguide 21 comprises a partially reflective output end facet 22. The output end facet is a flat etched facet. A second end facet of the first waveguide could be an input end facet or an output end facet, for example also a partially reflective output end facet. Light passing the output end facet 22 of the first waveguide 21 propagates along a first propagation direction D21. The output end facet 22 is normal to the first propagation direction D21.

A second waveguide 23 comprising an input end facet 24 is arranged at a distance from the first waveguide 21. The second waveguide 23 is rotated relative to the first waveguide. The input end facet 24 of the second waveguide 23 is spaced from the output end facet 22 of the first waveguide 21. The input end facet 24 is an angled facet. The input end facet 24 is, for example, not normal to the central longitudinal axis of the second waveguide 23.

The second waveguide 23 receives the light passing the output end facet 22 of the first waveguide 21 at the input end facet 24 of the second waveguide 23. The second waveguide 23 guides the light in a second propagation direction D22, which is different from the first propagation direction D21 due to an arrangement of the first waveguide 21 and the second waveguide 23 relative to each other. The input end facet 24 is not normal to the second propagation direction D22.

A certain amount of light is reflected at the output end facet 22 into the first waveguide 21 and the rest of the light propagates through an etched region 25, e.g. a deep etched area, as free space propagation. At the input end facet 24, some reflection occurs, as show with R26, to the downward to block FP resonance.

In an embodiment, an angle between the first propagation direction D21 and the second propagation direction D22 is equal to an angle of refraction at the input end facet 24, e.g. the rotation of the second waveguide 23 is set to exactly match the angle of refraction at the input end facet 24.

In an embodiment, a 7° angled facet is used for waveguide 23 and a trench, e.g. an area between the waveguides, is filled with air. Because of the refraction angle of 23° for index 3.2 (waveguide) and 1(air) the needed rotation angle for waveguide 23 to then amounts to 23°-7°=16°. Because waveguide 23 is rotated to the angle of refraction, the amount of light coupled from waveguide 21 to waveguide 23 is significantly increased. To further optimize the coupling, the waveguide 23 may be formed as a tapered waveguide to collect the light.

The discontinuity of the index between waveguide and the etched region 25, e.g. the etched area determines the reflection at the border, e.g. about 27% for InP and air. If the etched region is filled with different material, the reflection could be changed. For example, if the etched region 25 is filled with polymer (index=1.44), the reflection is decreased to 15%.

The embodiment needs only few μm from the waveguide 21 to the waveguide 23 because of the deep etch process in the etched region 25. This provides an advantage in comparison with the MMI and loop type mirror approach, since the MMI and loop mirror are large of size over 80 μm and a few hundred μm, respectively.

The waveguides 21 and 23 could be passive and/or active structures. The proposed concept uses free space propagation to couple the two waveguides, therefore this does not need long taper structures. This provides an advantage in comparison with conventionally used butt-joint method to connect passive and active waveguide. In other words, waveguide 21 and 22 can be selected as passive or active for different applications.

Different structures of the optical component 20, for example, different amount of the waveguides included, may be present in embodiments. The optical component 20 may comprise, for example, one first waveguide and two second waveguides in accordance with an embodiment.

For a novel design of lasers, different mirror types can be combined with the optical component 20, e.g. external cavity mirror, ring based mirror, DBR and etc.

However, it should be noted that the optical component 20 may optionally be supplemented by any of the features, functionalities and details disclosed herein, both individually or taken in combination.

FIG. 6 shows a schematic view of an optical component 30 in accordance with an embodiment.

The optical component 30 comprises three waveguides 31, 33 and 37. A first waveguide 31 comprises a partially reflective output end facet 32 and an input end facet 32'. Both end facets 32 and 32' are flat etched facets. Both end facets 32 and 32' are partially reflective. The first waveguide 31 is a FP cavity.

A second waveguide 33 comprising an input end facet 34 is arranged at a distance from the first waveguide 31. The second waveguide 33 is rotated relative to the first waveguide 31. The input end facet 34 of the second waveguide 33 is spaced from the output end facet 32 of the first waveguide 31. The input end facet 34 is an angled facet. The input end facet 34 is, for example, not normal to the central longitudinal axis of the second waveguide 33.

A third waveguide 37 comprising an output end facet 38 is arranged at a distance from the first waveguide 31. The third waveguide 37 is rotated relative to the first waveguide 31. The output end facet 38 of the third waveguide 37 is spaced from the input end facet 32' of the first waveguide 31. The output end facet 38 is an angled facet. The output end facet 38 is, for example, not normal to the central longitudinal axis of the third waveguide 37.

Light propagates along a first propagation direction D31 in the third waveguide 37, e.g. the first propagation direction D31 is parallel to a central longitudinal axis of the third waveguide 37 and passes the output end facet 38 of the third waveguide 37 to propagate through an etched region 39, e.g.

a deep etched area, as free space propagation. The light then enters the input end facet 32' of the first waveguide 31, e.g. of the FB cavity, and exits the output end facet 32 of the first waveguide 31 to propagate through an etched region 35, e.g. a deep etched area, as free space propagation.

The second waveguide 33 receives the light passing the output end facet 32 of the first waveguide 31 at the input end facet 34 of the second waveguide 33. The second waveguide 33 guides the light in a second propagation direction D32, e.g. the second propagation direction D32 is parallel to a central longitudinal axis of the second waveguide 33.

Connecting the two structure using the new approach reduces the unwanted additional reflection from the boundary and increases the efficiency of light coupled by input and output waveguides.

The waveguide 31 could be passive and/or active structure. This provides many options for photonic components, especially for lasers and PICs. In case of the optical component 30 shown in FIG. 6, it is a novel concept for FP lasers when the FP structure (the waveguide 31) is an active waveguide. If the FP structure (waveguide 31) is a passive waveguide, the optical component 30 becomes a FP filter.

However, it should be noted that the optical component 30 may optionally be supplemented by any of the features, functionalities and details disclosed herein, both individually or taken in combination.

The embodiments described herein can find applications in many of lasers and PIC circuits.

One very promising application is the monolithic integration of a Mode-Locked-Laser (MLL) device with a Semiconductor Amplifier (SOA) in order to increase the output power of the different modes. In this case etched facets have to be used for the MLL in order to realise the needed precise mode spacing. On the other hand, an efficient coupling to the SOA structure is needed to realise maximum output power.

FURTHER EMBODIMENTS AND ASPECTS

In the following, further aspects and embodiments according to the invention will be described, which can be used individually or in combination with any other embodiments disclosed herein.

Moreover, the embodiments disclosed in this section may optionally be supplemented by any other features, functionalities and details disclosed herein, both individually and taken in combination.

Reflectors are of fundamental importance in lasers because they determine the characteristics of a laser cavity. Broadband reflectors that replace cleaved facets [1.1] have attracted interest for their application in integrated Fabry-Perot (FP) lasers or in laser devices where a tight length control is needed. There are several options for this application, e.g. deep etched distributed Bragg grating (DBR) [1.2], multimode interferometer (MMI) reflector [1.3], loop mirror [1.4], and etched facet [1.5].

Figures 1A, 1B, 2:
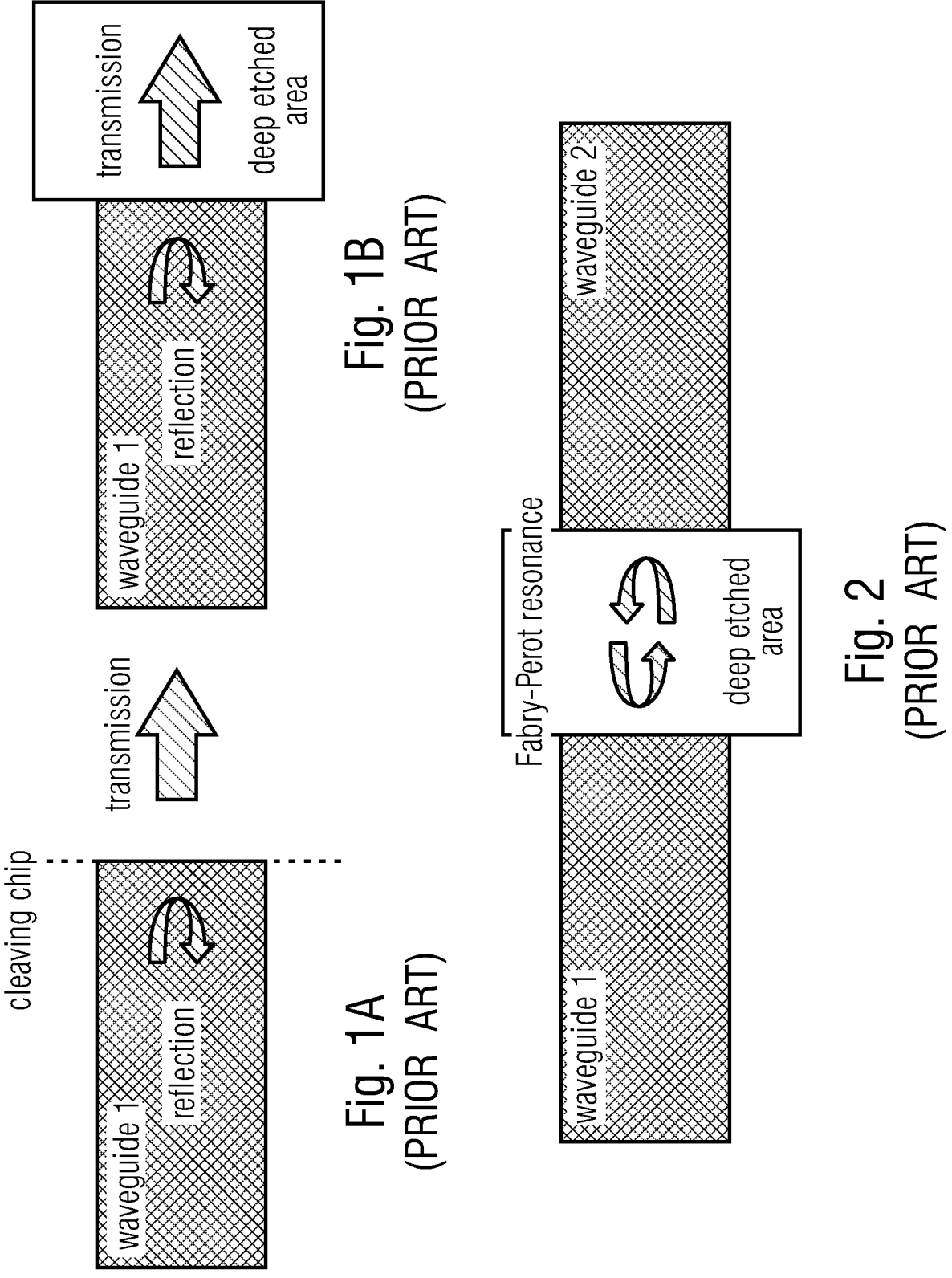
FIG. 1A shows a schematic view of a waveguide with a cleaved facet as known from conventional technology.
FIG. 1B shows a schematic view of a waveguide with an etched facet as known from conventional technology.
FIG. 2 shows a schematic view of an optical component as known from conventional technology.

The conventional way to realise broadband reflectors is to use cleaved facets:

Cleaved-facets can be used to form a reflector because of a discontinuity of refractive index between waveguide and cladding as shown in FIG. 1A. Fabrication of the facet is relatively simple by mechanical cleaving process on wafers. Reflection shows flat over a wide range of wavelengths and the reflectivity can be controlled by coating. Despite its advantages, the cleaving process is not very precise resulting in a length tolerance of cleaved FP laser of about ±10 μm.

For a lot of applications this is not precise enough.

Alternative Options:

DBR is a widely used method because of its wavelength selectivity and the possibility to adjust the reflectivity. Such DBRs can be generated anywhere in a chip. Another advantage is that at DBRs transmitted light propagates though the DBR. To realize a broadband reflectivity, DBRs with deep etched gratings are used. [1.6] However, the realization of deep etched gratings with grating periods in the sub-micron range is quite challenging because of its high aspect ratio. MMI [1.3] and loop mirrors [1.4] are based on interference effects in waveguides or couplers. They are particularly useful in photonic integrated circuits (PIC) because of their ease of fabrication and unrestricted position. However, these reflectors are suffering from a large footprint and thus are not suitable for single devices.

The use of etched facets [1.5] is a very promising approach. Etched facets keep the advantages of cleaved facets but avoid the above mentioned large cleaving process tolerances (FIG. 1B). The error of fabrication here reduces to about ±200 nm or even less. However if such etched facets are used in integrated devices, an optical coupling of another waveguide is difficult due to unintended reflections from the opposite facet. FIG. 2 shows this situation where two waveguides are connected using etched facets. Because of the two unavoidable discontinuities an unintended FP is formed in the etched area between the two waveguides. Patent [1.7] tried to eliminate these FP resonances by using an angled facet on the waveguide 2 as depicted in FIG. 3. Part of the light is reflected downward at the angled facet and thus no resonance occurs in the etched region.

However, the coupling efficiency from waveguide 1 to 2 is quite low because of the refraction effect at the angled facet. In other words, a considerable amount of light propagates upward because of the angled facet, which leads to high coupling lass.

In contrast to the latter approach, a novel method to improve coupling efficiency from the etched facet to additional waveguides by using a combination of rotation and angled facet is proposed.

REFERENCES

[1.1] Tetsuhiko Ikegami, "Reflectivity of mode at facet and oscillation mode in double-heterostructure injection lasers", IEEE J. Quantum Electron. 8 (6), 1972

[1.2] Jens Buus, Markus-Christian Amann, Daniel J. Blumenthal, "Tunable Laser Diodes and Related Optical Sources", 2nd Edition Wiely, 2005, p. 50

[1.3] Emil Kleijin, Meint K. Smit and Xaveer J. M. Leijtens, "Multimode Interference Reflectors: A New Class of Components for Photonic Integrated Circuits", J. Light. Technol. 31 (18), 2013

[1.4] Y. Huang, et al., "A Single-Directional Microcavity Laser with Microloop Mirrors and Widened Medium Realized With Quantum-Well Intermixing", IEEE Photon. Technol. Lett. 18 (1), 2006

[1.5] Teruhito Matsui "GaInAsP/InP lasers with etched mirrors by reactive ion etching using a mixture of ethane and hydrogen", Appl. Phys. Lett. 54, 1989

[1.6] Todd C. Kleckner, et al., "Design, Fabrication, and Characterization of Deep-Etched Waveguide Gratings", J. Light. Technol. 23 {11), 2005

[1.7] International patent WO2004068542A2

According to an aspect of the invention, a new etched facet using a rotated coupled waveguide with angled facet to improve coupling efficiency is provided. This concept includes a waveguide with flat facet (waveguide 1) and coupled to a waveguide with angled facet, which is rotated by an angle of refraction at the angled facet (waveguide 2) as depicted in FIG. 5.

The rotated waveguide can be used to couple light of refraction from the angled discontinuity as presented in patent [2.1]. The patent proposed a method to connect two different waveguides formed by butt-joint technology with low reflection from an angled border [1.7]. Moreover, the waveguide is rotated to match the angle of refraction. This concept represents a practical method to couple light of refraction at angled discontinuity, however this applies only to connect two waveguides and cannot be used as reflector.

In contrast to the patent [1.7], a concept according to an aspect of the invention connects a flat etched facet and an angled waveguide with rotation, similar as [2.1]. A certain amount of light is reflected at the etched facet into waveguide 1 and the rest of light propagates through the etched region as free space propagation. At the angled facet, some reflection occurs to the downward as [1.7] to block FP resonance.

However, in this aspect according to an aspect of the invention the rotation of waveguide 2 is set to exactly match the angle of refraction at the angled facet.

For example:

Use of a 7° angled facet for waveguide 2 and a trench filled with air.

Because of the refraction angle of 23° for index 3.2 (waveguide) and 1(air) the needed rotation angle for waveguide 2 to then amounts to 23°-7°=16°. Because waveguide 2 is rotated to the angle of deflection, the amount of light coupled from waveguide 1 to waveguide 2 is significantly increased. To further optimize the coupling, a tapered waveguide can be applied to collect the light.

The discontinuity of the index between waveguide and etched area determines the reflection at the border, e.g. about 27% for InP and air. If the etched area is filled with different material, the reflection can be changed. For example, if the area is filled with polymer (index=1.44), the reflection is decreased to 15%.

Compared to the MMI and loop type mirror approach, this concept according to an aspect of the invention has the advantage of small footprint. As mentioned above, MMI and loop mirror are large of size over 80 µm and a few hundred µm, respectively. Proposed new concept according to an aspect of the invention needs only few µm from waveguide 1 to 2 because of the deep etch process.

Moreover, the new concept according to an aspect of the invention can be applied to passive or active structures in waveguide 1 and 2. Usual technique to connect passive and active waveguide is a butt-joint method. The proposed concept uses free space propagation to couple the two waveguides, therefore this does not need long taper structures. In other words, waveguide 1 and 2 can be selected as passive or active for different applications.

For a novel design of lasers, different mirror types can be combined with this concept, e.g. external cavity mirror, ring based mirror, DBR and etc.

One application for this concept is a FP cavity as depicted in FIG. 6. Connecting the two structure using the new approach reduces the unwanted additional reflection from the boundary and increases the efficiency of light coupled by input and output waveguides.

For different applications, waveguide 1 and 2 can be used as active or passive section. This provides many options for photonic components, especially for lasers and PICs. In case of the proposed concept according to an aspect of the invention shown in FIG. 6, it is a novel concept for FP lasers when the FP structure is an active waveguide. If the FP structure has a passive waveguide, it becomes a FP filter.

[2.1] U.S. Pat. No. 7,817,882

The most important advantage of the proposed concept according to an aspect of the invention is the high coupling efficiency between the two coupled waveguides. Typical angled waveguides for the etched facet lose most of the light because of the refraction at the facet. In our concept we rotate the coupled waveguide to match the angle of refraction.

The use of an etched facet with a high coupling to a second waveguide is a promising candidate to realise simple broadband reflectors and excellent performance.

Possible applications according to an aspect of the invention are in many of lasers and PIC circuits.

One very promising application according to an aspect of the invention is the monolithic integration of a Mode-Locked-Laser (MLL) device with a Semiconductor Amplifier (SOA) in order to increase the output power of the different modes. In this case etched facets have to be used for the MLL in order to realise the needed precise mode spacing. On the other hand an efficient coupling to the SOA structure is needed to realise maximum output power.

Moreover, it should be noted that the embodiments and procedures may be used as described in this section, and may optionally be supplemented by any of the features, functionalities and details disclosed herein (in this entire document), both individually and taken in combination.

IMPLEMENTATION ALTERNATIVES

While this invention has been described in terms of several advantageous embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. An optical component comprising:

at least one first waveguide, the at least one first waveguide comprising at least one partially reflective output end facet, wherein light passing the at least one partially reflective output end facet of the at least one first waveguide propagates along a first propagation direction, and at least one second waveguide receiving the light passing the at least one partially reflective output end facet of the at least one first waveguide at an input end facet of the at least one second waveguide and guiding the light in a second propagation direction, wherein the at least one partially reflective output end facet and the input end facet are spaced from each other, wherein the at least one first waveguide and the at least one second waveguide are arranged such that the first propagation direction and the second propagation direction are different, wherein the at least one partially reflective output end facet is normal to the first propagation direction, and the input end facet is not normal to the second propagation direction, wherein an angle (θ) between the first propagation direction and the second propagation direction is equal to an angle of refraction at the input end facet, wherein a rotation of the at least one second waveguide is set to exactly match the angle of refraction at the input end facet, and wherein the at least one second waveguide is a tapered waveguide, the tapered waveguide having a cross-sectional area decreasing along a direction away from the input end facet.

2. The optical component according to claim 1, wherein at least one of the at least one partially reflective output end facet and the input end facet is an etched facet or a cleaved facet.

3. The optical component according to claim 1, wherein the at least one partially reflective output end facet and the input end facet are not in contact with each other.

4. The optical component according to claim 1, wherein a distance (L) between the at least one partially reflective output end facet and the input end facet is about a few $\mu m$, at a range of about 1-10 $\mu m$.

5. The optical component according to claim 1, comprising at least two second waveguides.

6. The optical component according to claim 1, wherein the at least one first waveguide and the at least one second waveguide are passive components or active components.

7. The optical component according to claim 1, wherein the at least one first waveguide is a laser cavity, advantageously a Fabry-Perot cavity.

8. The optical component according to claim 6, wherein the optical component is a Fabry-Perot laser or a Fabry-Perot filter.

9. The optical component according to claim 1, wherein the at least one partially reflective output end facet is an external cavity mirror, a ring based mirror or a distributed Bragg reflector (DBR).

10. The optical component according to claim 1, wherein a region between the at least one partially reflective output end facet and the input end facet is filled with a gas or a transparent material.

* * * * *